United States Patent [19]

Ikari

[11] Patent Number: 5,190,445
[45] Date of Patent: Mar. 2, 1993

[54] VARIABLE CAPACITY PUMP CONTROLLER OF HYDRAULICALLY DRIVEN WHEEL

[75] Inventor: Masanori Ikari, Kawagoe, Japan

[73] Assignees: Kabushiki Kaisha Komatsu Seisakusho; Komatsu Mec Kabushiki Kaisha, both of Tokyo, Japan

[21] Appl. No.: 773,661

[22] PCT Filed: Apr. 17, 1990

[86] PCT No.: PCT/JP90/00499

§ 371 Date: Oct. 17, 1991

§ 102(e) Date: Oct. 17, 1991

[87] PCT Pub. No.: WO90/13762

PCT Pub. Date: Nov. 15, 1990

[30] Foreign Application Priority Data

Apr. 28, 1989 [JP] Japan .................... 1-107403

[51] Int. Cl.⁵ .................................. F04B 49/08
[52] U.S. Cl. .................................. 417/218
[58] Field of Search .......................... 417/218

[56] References Cited

U.S. PATENT DOCUMENTS 4,216,656  8/1980  Hamma .

FOREIGN PATENT DOCUMENTS

| 78861 | 5/1983 | European Pat. Off. | ............ 417/218 |
| 51-148587 | of 0000 | Japan . | |
| 131891 | 8/1982 | Japan | .................... 417/218 |
| 59-183562 | 12/1984 | Japan . | |
| 63-259181 | 10/1988 | Japan . | |
| 1090915 | 5/1984 | U.S.S.R. | .............. 417/218 |
| 1415977 | 12/1975 | United Kingdom | ............... 417/218 |

*Primary Examiner*—Leonard E. Smith
*Attorney, Agent, or Firm*—Flynn, Thiel, Boutell & Tanis

[57] ABSTRACT

This invention relates to a variable capacity pump controller for an industrial vehicle such as a shovel loader using a static hydraulic driving system. In a hydraulically driven vehicle equipped with a variable capacity hydraulic pump (P), the controller of the invention includes variable throttle devices (11, 13) (21, 24), (31, 35), (41, 46) which are disposed in pilot hydraulic circuits (10, 12), (20, 22), (30, 32), (40, 42) of a pump capacity control cylinder (C) for controlling the capacity hydraulic pump (P) and operate in such a manner as to change the operation speed of the pump capacity control cylinder (C) in accordance with the oil pressure of a main hydraulic circuit (S). According to this construction, the variable throttle device operates in such a manner as to open a check valve or a throttle valve in the pilot circuit of the pump capacity control cylinder when the hydraulic driving main circuit is at a high pressure. Therefore, a return hydraulic circuit of the pump control cylinder is expanded to speed up the reducing speed of the pump capacity and to prevent an excessive torque to an engine.

4 Claims, 9 Drawing Sheets

VARIABLE CAPACITY PUMP CONTROLLER OF HYDRAULICALLY DRIVEN WHEEL

FIELD OF THE INVENTION

The present, invention relates to a variable capacity pump controller for a hydraulically driven wheel adapted for controlling a variable capacity hydraulic pump adapted for increasing, and decreasing an rpm of an engine of a vehicle in accordance with a driving load in an industrial vehicle such as a shovel loader using a static hydraulic driving system.

DESCRIPTION OF THE PRIOR ART

FIGS. 6 and 8 are views explaining systems of a conventional variable capacity pump controller of hydraulically driven wheel.

In FIG. 7, a variable capacity control cylinder C for controlling a variable capacity hydraulic pump P (hereinafter referred to as variable pump) has a pilot circuit a provided with a throttle valve b wherein the operation speed of the pump capacity control cylinder C can be changed at the same speed in both directions to increase and reduce the pump capacity. Designated at E is an engine, A is a control pump, V is a control valve, K is a charge circuit, M is a motor and S is a main circuit.

In FIG. 8, a pilot circuit a includes a one way throttle valve d composed of a throttle valve $d_1$ and a check valve $d_2$ in which a pressurized oil flows through the check valve $d_2$ in the direction to increase the pump capacity while pressurized oil flows through the throttle valve $d_1$, in the direction to decrease the capacity whereby travelling performance and stability of the vehicle are made compatible with each other by increasing the acceleration at the time of accelerating the speed of the vehicle and decreasing the deceleration rate at the time of reducing the speed.

In the conventional variable capacity pump controller of hydraulically driven wheel as illustrated in FIG. 7 and 8, the acceleration and deceleration of the vehicle are regulated and the operational instability at the time of switching to forward or backward motion and varying an rpm of the engine are improved by controlling the operation speed of the pump capacity control cylinder C having the throttle valve b or one way throttle valve d in the pilot circuit thereof.

The conventional variable capacity pump controller operates effectively in a normal travelling state but has the following problem in an excavating and loading operation by the shovel loader and the like. That is, when the vehicle carries out the excavation and loading operations, the driving load increases sharply. At this time, the variable pump P tends to pull back the pump capacity control cylinder C in the direction to reduce the pump capacity due to the increase of the oil under pressure in the main circuit S. However, an amount, of oil to be escaped from the control cylinder C is limited due to the presence of the throttle valve b or $d_1$ in the pilot circuit a whereby the reducing speed of the pump capacity is reduced and a torque of the variable pump P to be applied to the engine is increased, which causes the problem of decreasing the rpm of the engine. As a result, there were other problems in that the loading efficiency is decreased and the engine stops since an excessive torque is applied to the engine in case that the pressurized oil is used for controlling the variable pump and performing the excavating and loading operations.

It is therefore an object of the present invention to solve the problems of the conventional variable capacity pump controller of hydraulically driven wheel and to provide a conventional variable capacity pump controller of hydraulically driven wheel capable of speeding up the reducing speed of the pump capacity and preventing the excessive torque to the engine.

SUMMARY OF THE INVENTION

To achieve the above object, the present invention is to provide a variable capacity pump controller in a hydraulically driven vehicle equipped with a variable capacity hydraulic pump, the controller includes variable throttle devices which are disposed in pilot circuits of a pump capacity control cylinder for an industrial vehicle such as a shovel loader using a static hydraulic driving system. In a hydraulically driven vehicle equipped with a variable capacity hydraulic pump, the controller of the invention includes variable throttle devices which are disposed in pilot hydraulic circuits of a pump capacity control cylinder for controlling the capacity of the hydraulic pump and operate in such a manner as to change the operation speed of the pump capacity control cylinder in accordance with the oil pressure of a main hydraulic circuit.

According to this construction, the variable throttle device operates in such a manner as to open a check valve or a throttle valve in the pilot circuit of the pump capacity control cylinder when the hydraulic driving main circuit is at a high pressure. Therefore, a return hydraulic circuit of the pump control cylinder is expanded to speed up the reducing speed of the pump capacity and to prevent an excessive torque to an engine.

DESCRIPTION OF THE PREFERRED EMBODIMENTS

The embodiments of the present invention will be described more in detail with reference to FIGS. 1 to 6 and 9.

Figure 1:
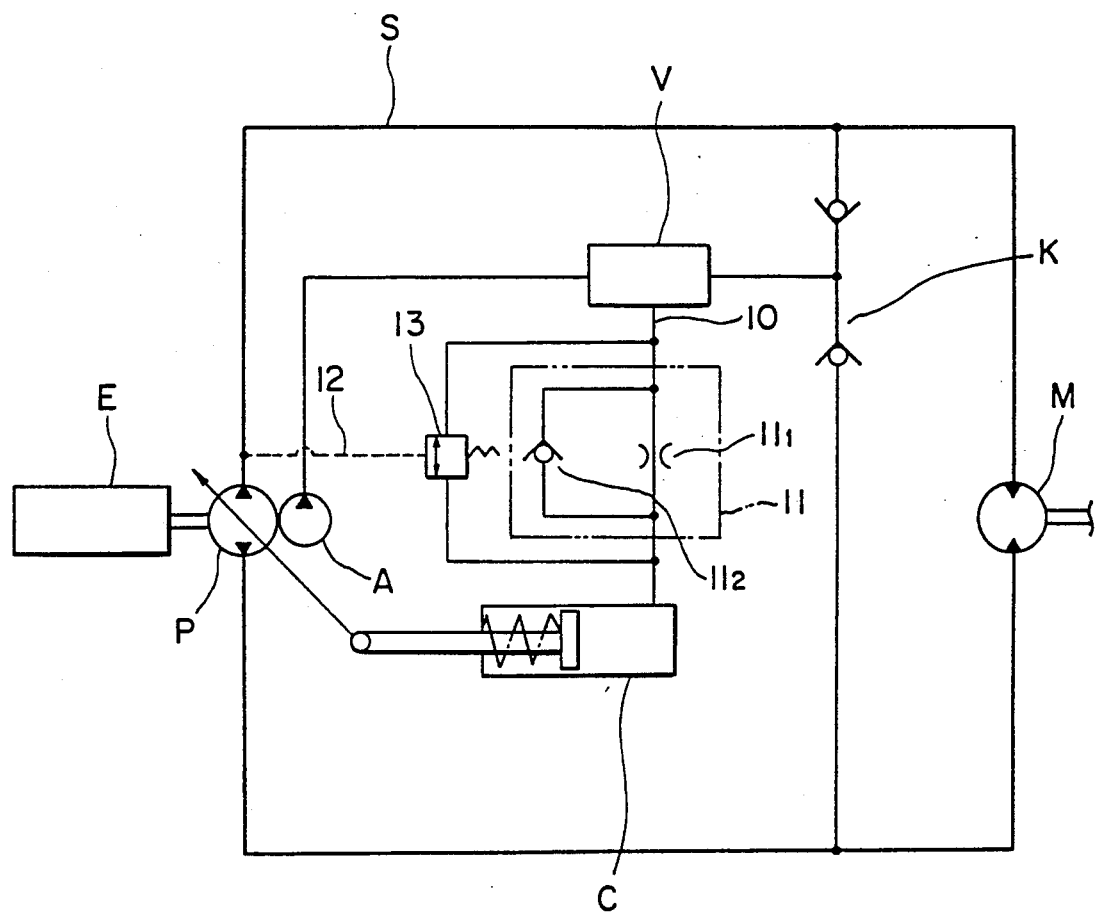
FIGS. 1 to 4 are hydraulic circuit diagrams of the variable capacity pump controller according to the first to fourth embodiments of the present invention.
Figure 8:
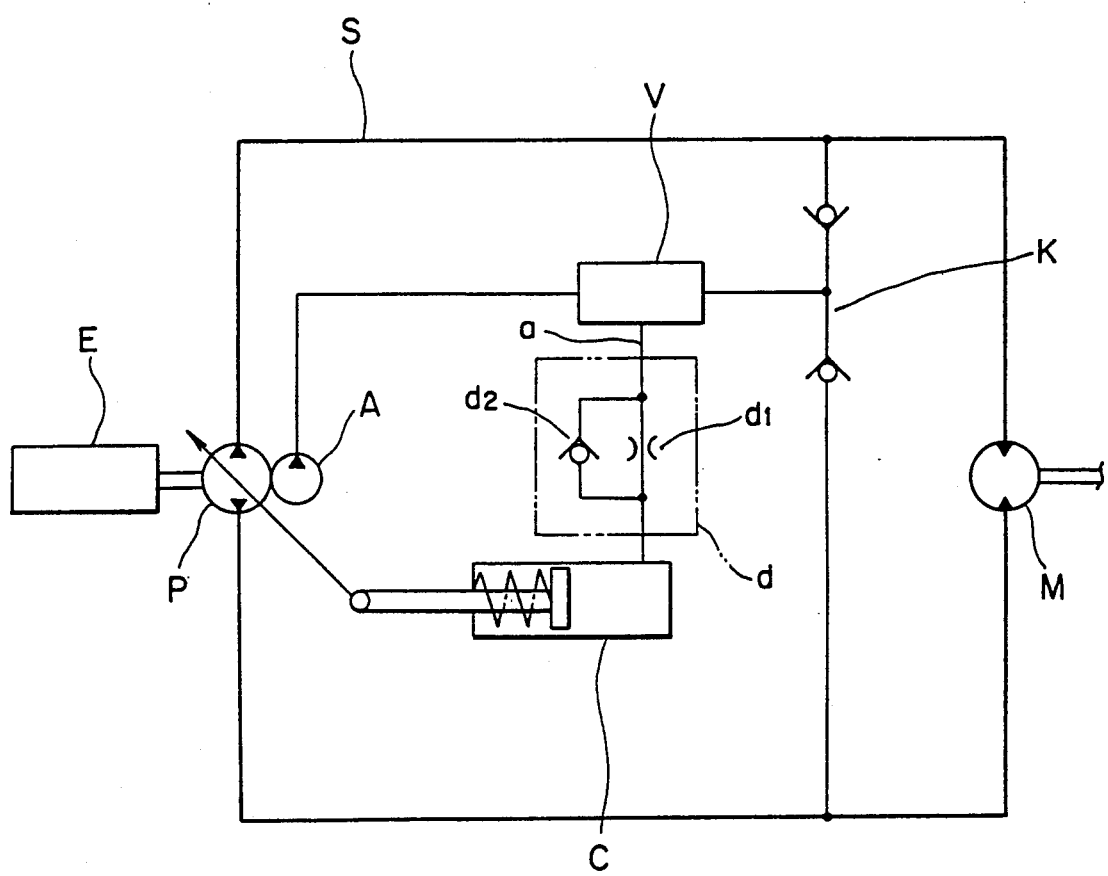

FIG. 1 is the hydraulic circuit diagram explaining the system of the variable capacity pump controller according to the first embodiment of the present invention. Constituents of the variable capacity pump controller in FIG. 1 which are the same as those of the conventional variable capacity pump controller in FIG. 8 have same numerals.

In FIG. 1, a pilot circuit 10 of a pump capacity control cylinder C has a one way throttle valve 11 ($11_1$ is a throttle valve and $11_2$ is a check valve) and a pilot operated directional control valve 13 connected to a pilot pipe 12 in a main circuit S. Since the directional control valve 13 is disposed in parallel with the one way valve 11 in the pilot circuit 10, the directional control valve 13 opens when the oil pressure of the main hydraulic circuit S exceeds a setting of the directional control valve 13. As a result, the pressurized oil in the control cylinder C flows through the directional control valve 13 so that the reducing speed of the discharging rate of the variable pump P is increased.

Figure 2:
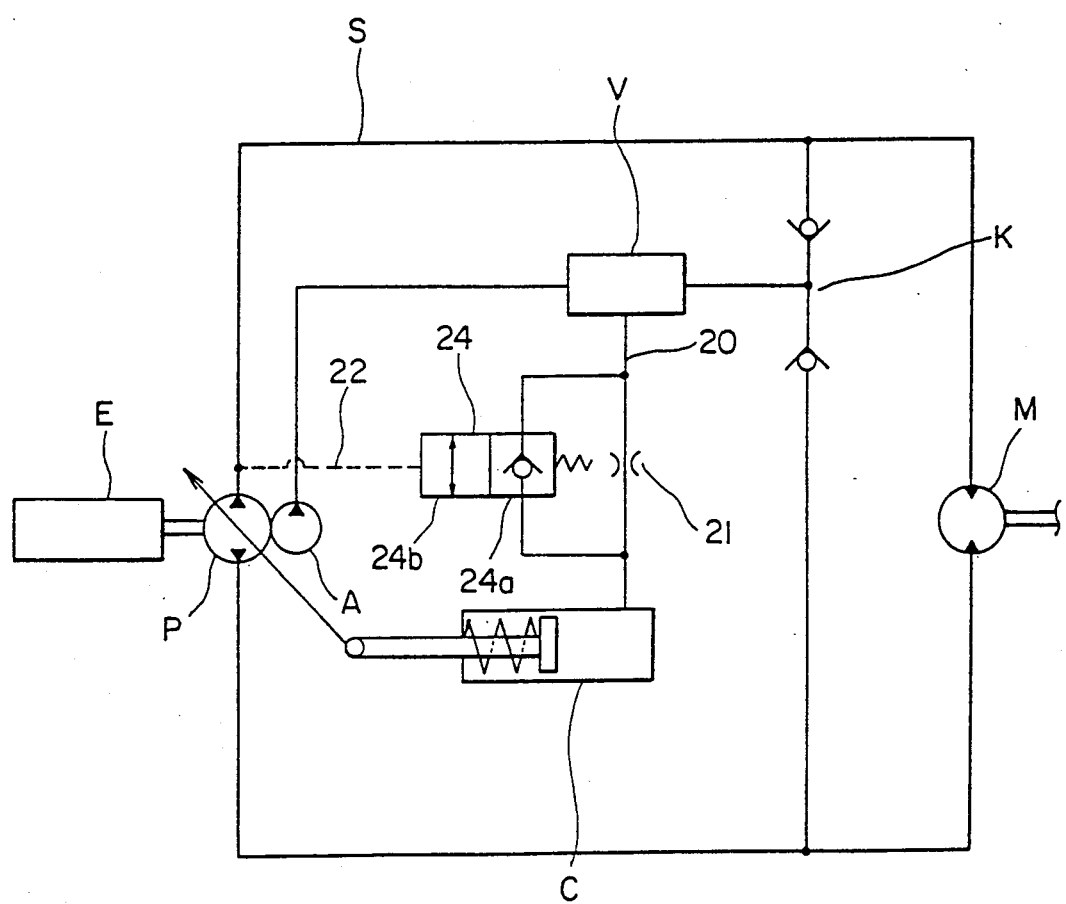

FIG. 2 is the hydraulic circuit diagram explaining the system of the variable capacity pump controller according to the second embodiment of the present invention. In FIG. 2 a pilot circuit 20 of the pump capacity control cylinder C has a throttle valve 21 and a pilot operated check valve 24. The check valve 24 is operable by an oil pressure in the main circuit S which is supplied through a pilot pipe 22. The check valve 24 is disposed in parallel with the throttle valve in the pilot circuit 20. The pressurized oil in the control cylinder C flows through a communicating position 24b of the check valve 24 since the checking position 24a is switched to the communicating position 24b when the oil pressure of the main hydraulic circuit S exceeds a setting pressure of the check valve 24 so that the reducing speed of the discharging capacity of the variable pump P is increased.

Figure 3:
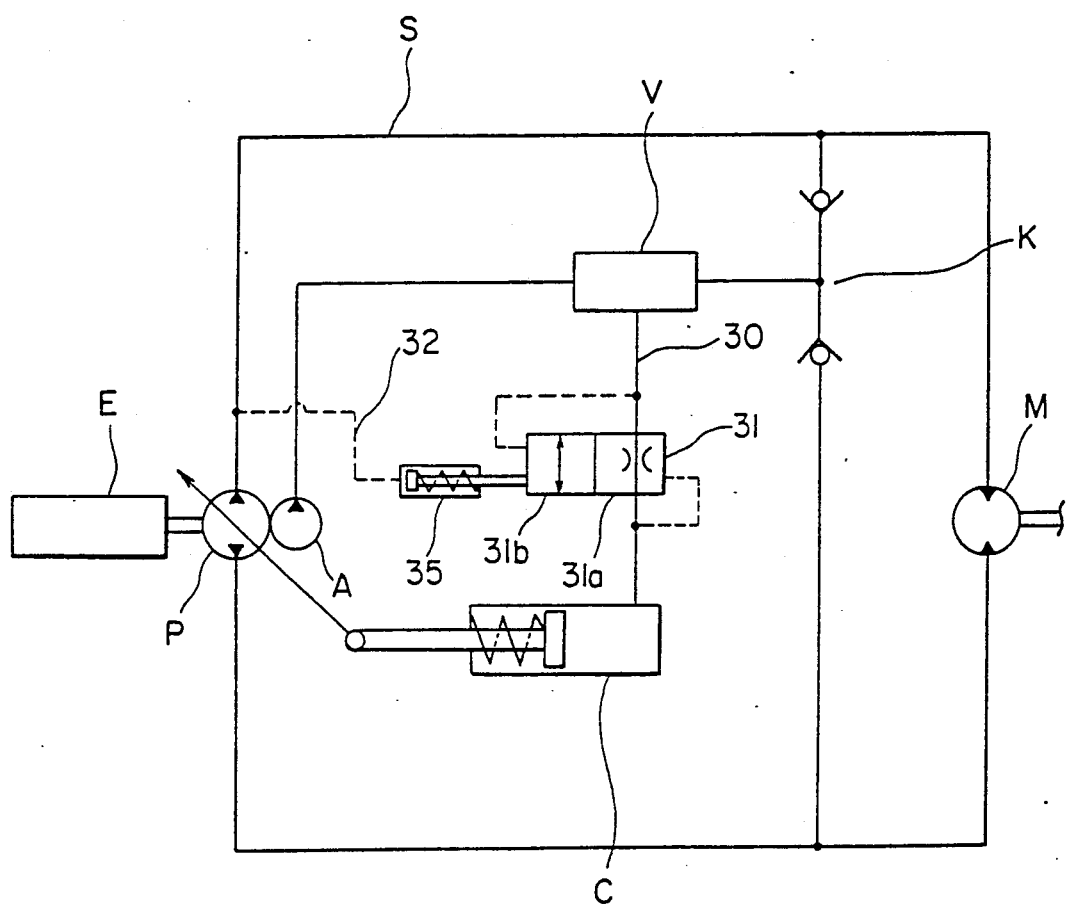

In FIG. 3 showing the circuit diagram of the third embodiment, a pilot circuit 30 of the pump capacity control cylinder C has a one way throttle valve 31, which has a piston 35 operable by the oil pressure of the main circuit S which is supplied through a pilot pipe 32. When the oil pressure in the main hydraulic circuit S becomes greater than the resilience force of the spring of the piston 35, the piston 35, even if it is in the checking position 31a, switches the one way throttle valve 31 in a checking position 31a to a communicating position 31b so that the pressurized oil in the control cylinder C flows through a communicating position 31b. As a result, the reducing speed of the discharging capacity of the variable pump is increased.

Figure 4:
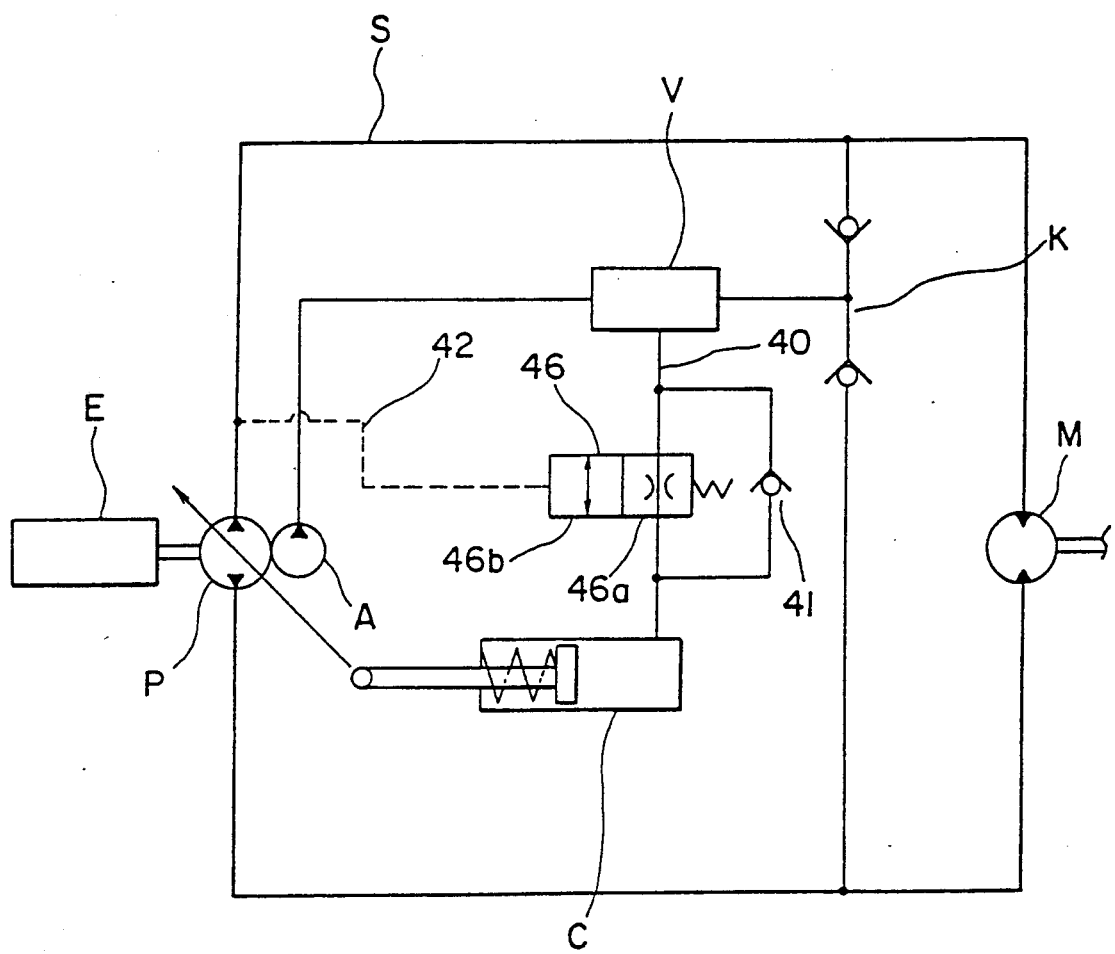

In FIG. 4 showing the circuit diagram of the fourth embodiment, a pilot circuit 40 of the pump capacity control cylinder C has a check valve 41 and a pilot operated variable throttle valve 46 which is disposed in parallel with the check valve 41 and operable by the oil pressure of the main circuit S which is supplied through a pilot hydraulic pipe 42. When the pressurized oil of the main circuit S increases, it becomes greater than the resilience force of the pilot operated throttle valve 46 so that the throttling area in the throttle valve 41 is increasingly expanded from a throttling position toward a communicating position. As a result, the pressurized oil in the control cylinder C increases its flowing speed as the oil pressure of the main circuit S becomes higher so that reducing speed of the discharging capacity of the variable pump is increased.

Modified examples of the variable capacity pump controller according to the first to fourth embodiments of the present invention will be described with reference to FIGS. 5 and 6. The modified examples relate particularly to the pilot pipes.

Figure 5:
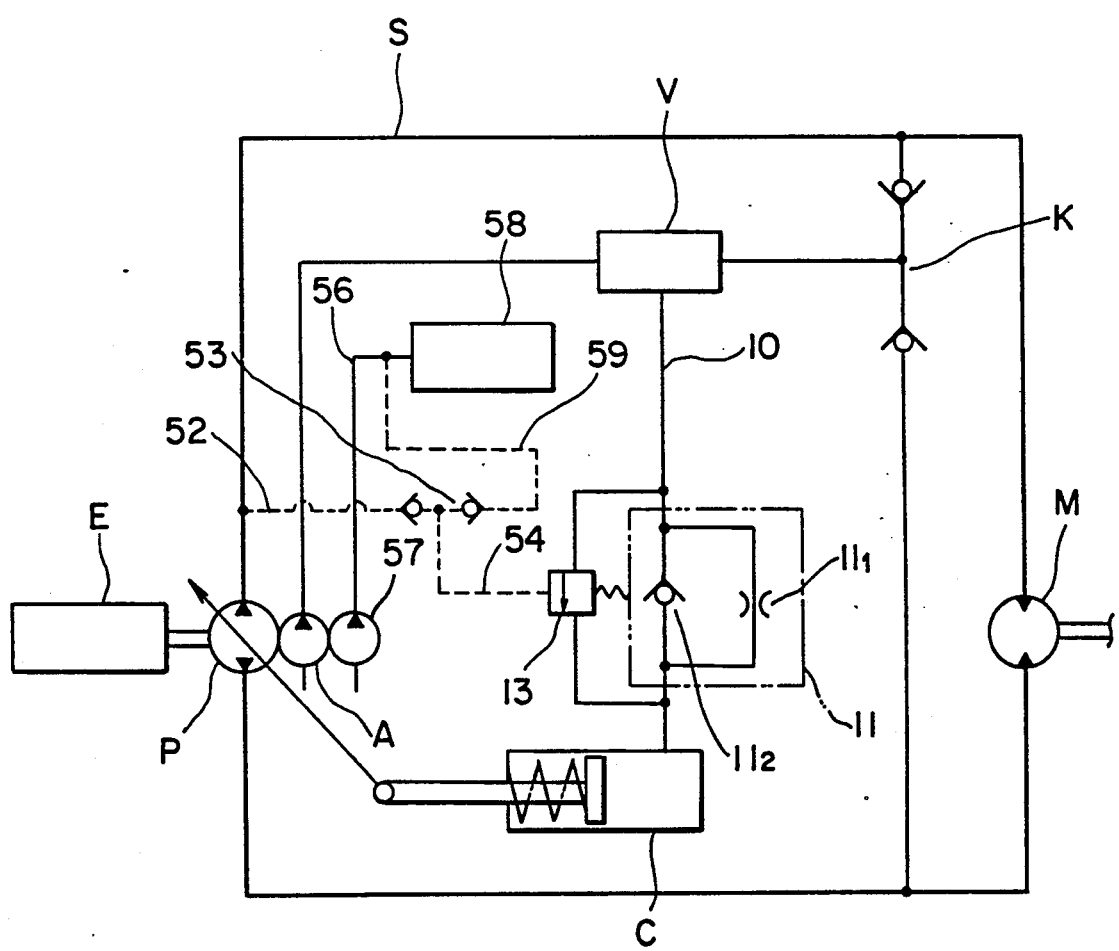
FIGS. 5 and 6 are hydraulic circuit diagrams of the variable capacity pump controller according to modified examples of the first embodiment.

In FIG. 5, connected to a shuttle valve 53 is a pilot pipe 52 of the main circuit S and a pipe 59 connected to a line 56. The line 56 is connected to a working pump 57 and a working operation valve 58. The higher pressurized oil of those from the pilot pipe 52 and from the line 59 is supplied to the pilot pipe 54.

Figure 6:
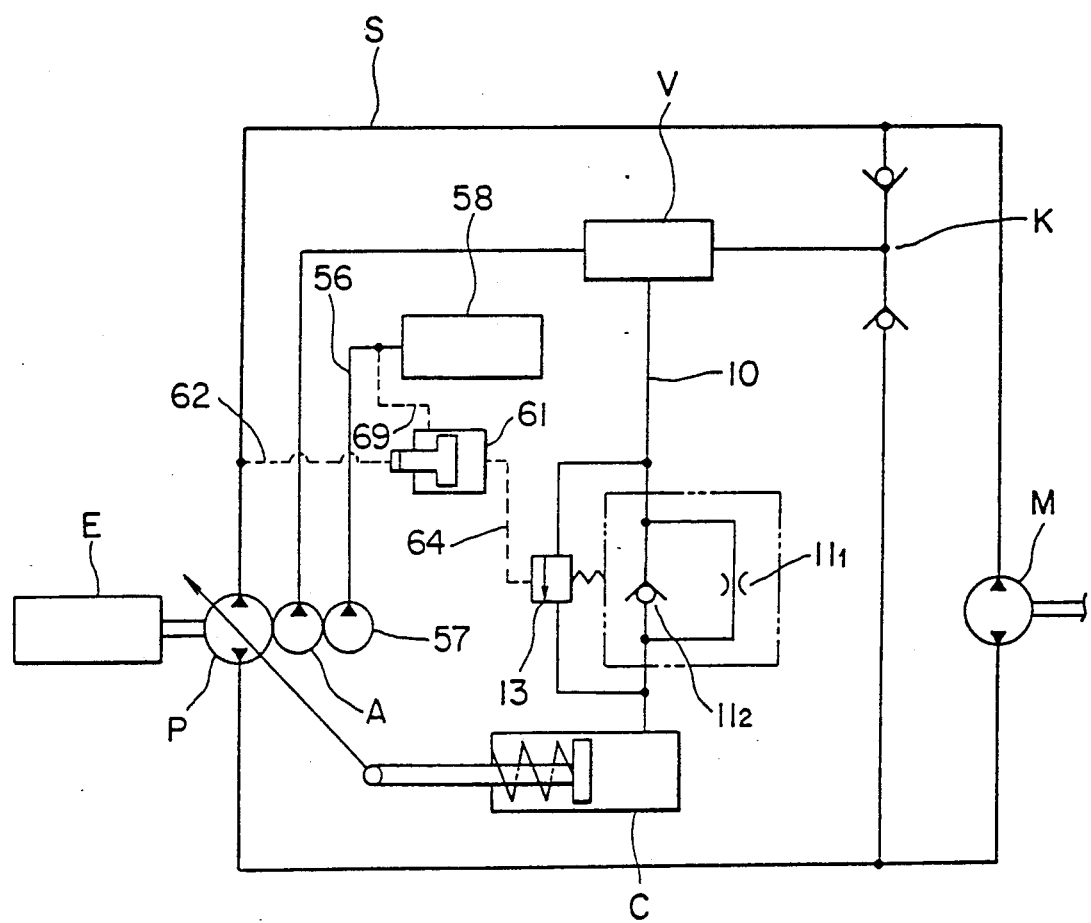
Figure 7:
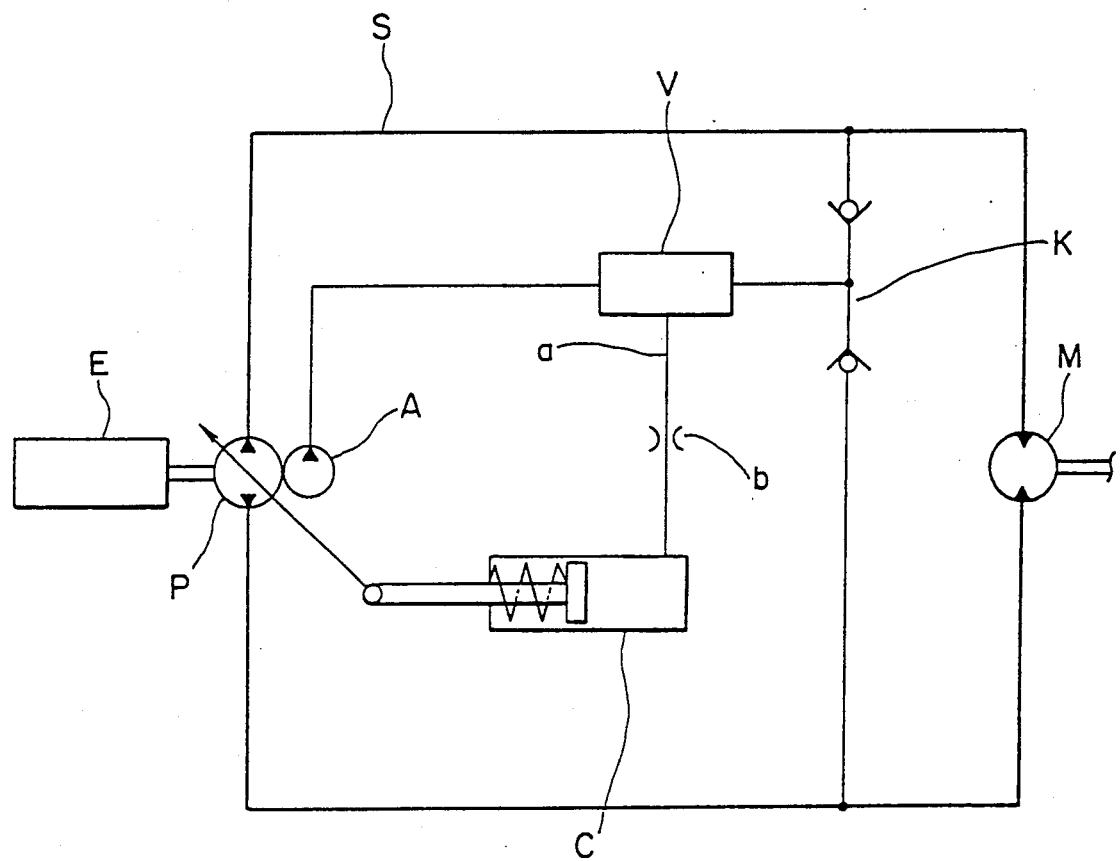
FIGS. 7 and 8 are hydraulic circuit diagrams of the conventional variable capacity pump controller.

In FIG. 6, connected to a multistage piston 61 is a pilot pipe 62 and a pilot pipe 69 connected to the line 56. The multistage piston 61 is connected to a pilot pipe 64. The pressurized oil supplied from the pilot pipe 62 and that supplied from the pilot pipe 69 are totaled in the multistage piston 61 and the thus totaled amount of the pressurized oil is supplied to the pilot pipe 64.

Although the pilot pipes as illustrated in FIGS. 5 and 6 are modified examples of the first embodiment, they can be applied to the second to fourth embodiments with ease.

Figure 9:
FIG. 9 is a chart showing change of discharge rate of a pump relative to oil pressure of a main circuit.

FIG. 9 is a chart showing change of discharge rate of a pump relative to oil pressure of a main circuit. When the pressure of the main circuit is greater than each of the setting pressures of the directional control valves (13 in FIG. 1, 24 in FIG. 2, 35 in FIG. 3 and 46 in FIG. 4), the reducing speed of the pump capacity is speeded up compared with the conventional variable capacity pump controller.

The following effects can be obtained since the reducing speed of the pump capacity is speeded up compared with the conventional variable capacity pump controller when the oil pressure of the main circuit is greater than the set pressure of the directional control valve.

(1) Even if the oil pressure of the main circuit increases sharply when the vehicle is operated by employing the bucket thereof for excavating and loading purposes, the reducing speed of the pump capacity is speeded up to prevent the torque applied to the engine from being excessive whereby the rpm of the engine is less lowered.

(2) Since the main circuit can select the reducing speed of the pump capacity at the optimum value at the high or the low pressure, it is possible to decelerate gently the speed of the vehicle when the hydraulic main circuit is at low pressure, such as during traveling on a flat road, whereby the reduction rate at the time of reducing the rpm of the engine and at the time of changing the gear to the forward or backward direction.

As mentioned above, according to the present invention, since a return hydraulic circuit of the pump control cylinder is expanded to speed up the reducing speed of the pump capacity and to prevent the excessive torque applied to the engine, it is preferably adapted for a variable capacity pump controller of hydraulically driven wheel.

I claim:

1. A control system for a variable capacity pump in a hydrostatic drive for a vehicle, comprising:
   a main hydraulic circuit having said variable capacity hydraulic pump therein;
   a pilot hydraulic circuit having a variable capacity control cylinder connected to said variable capacity hydraulic pump for controlling the pumping capacity of said variable capacity hydraulic pump, said pilot hydraulic circuit having a throttle valve and a pilot-operated check valve connected in parallel with said throttle valve, said throttle valve and said pilot-operated check valve being connected to said variable capacity control cylinder for controlling the operation speed of said variable capacity control cylinder, and means for operating said pilot-operated check valve in response to the pressure of the hydraulic fluid in said main hydraulic circuit so as to discharge hydraulic fluid from said variable capacity control cylinder when the pressure of the hydraulic fluid in said main hydraulic circuit is high.

2. A control system as claimed in claim 1 wherein said means for operating said pilot-operated check valve comprises a pilot pipe connected to said main hydraulic circuit.

3. A control system for a variable capacity pump in a hydrostatic drive for a vehicle, comprising:
- a main hydraulic circuit having said variable capacity hydraulic pump therein;
- a pilot hydraulic circuit having a variable capacity control cylinder connected to said variable capacity hydraulic pump for controlling the pumping capacity of said variable capacity hydraulic pump, said pilot hydraulic circuit having a pilot-operated, variable, throttle valve and a check valve connected in parallel with said pilot-operated, variable throttle valve, said pilot-operated, variable, throttle valve and said check valve being connected to said variable capacity control cylinder for controlling the operation speed of said variable capacity control cylinder, and means for operating said pilot-operated, variable, throttle valve in response to the pressure of the hydraulic fluid in said main hydraulic circuit.

4. A control system as claimed in claim 3 wherein said means for operating said pilot-operated check valve comprises a pilot pipe connected to said main hydraulic circuit.

* * * * *